(12) United States Patent
Suzuki et al.

(10) Patent No.: US 6,586,373 B2
(45) Date of Patent: Jul. 1, 2003

(54) WET FRICTION MATERIAL (75) Inventors: Makoto Suzuki, Shizuoka (JP); Masahiro Mori, Shizuoka (JP); Hideki Tatewaki, Shizuoka (JP); Sousuke Kawai, Shizuoka (JP); Hirokazu Yagi, Shizuoka (JP)

(73) Assignee: NSK-Warner Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/985,066

(22) Filed: Nov. 1, 2001

(65) Prior Publication Data

US 2002/0086132 A1 Jul. 4, 2002

(30) Foreign Application Priority Data

| Nov. 2, 2000 | (JP) | 2000-335338 |
| Nov. 6, 2000 | (JP) | 2000-337997 |
| Nov. 14, 2000 | (JP) | 2000-346043 |

(51) Int. Cl.$^7$ ............ C10M 107/50; C08J 5/14
(52) U.S. Cl. ............ 508/101; 508/107; 508/108; 508/100; 428/391; 523/149; 523/152
(58) Field of Search ............ 508/100, 101

(56) References Cited

U.S. PATENT DOCUMENTS

| 4,115,283 A | * | 9/1978 | Needham ............ 508/108 |
| 5,127,949 A | * | 7/1992 | Nakazawa et al. ............ 106/36 |
| 5,563,196 A | * | 10/1996 | Kitahara et al. ............ 524/14 |
| 5,895,716 A | * | 4/1999 | Fiala et al. ............ 428/408 |
| 5,972,090 A | * | 10/1999 | Horth ............ 106/36 |
| 6,060,536 A | * | 5/2000 | Matsumoto et al. ............ 523/156 |
| 6,121,168 A | * | 9/2000 | Irifune et al. ............ 442/169 |
| 6,130,176 A | * | 10/2000 | Lam ............ 442/101 |
| 6,130,177 A | * | 10/2000 | Kitahara et al. ............ 442/334 |
| 6,231,977 B1 | * | 5/2001 | Suzuki et al. ............ 428/375 |
| 6,265,066 B1 | | 7/2001 | Suzuki et al. |
| 6,331,358 B1 | * | 12/2001 | Kitahara et al. ............ 428/447 |
| 6,355,601 B1 | * | 3/2002 | Takenaka et al. ............ 508/108 |

* cited by examiner

Primary Examiner—Ellen M. McAvoy
(74) Attorney, Agent, or Firm—Sughrue Mion, PLLC (57) ABSTRACT

A wet friction material comprises a fiber base material, a filler and a binder: wherein the filler contains a disc-shaped diatomaceous earth; wherein the filler contains at least one of a filler having Mohs hardness of 8 to 9.5 and a diatomaceous earth and the binder contains a specific silicone resin binder; or wherein the binder contains another specific silicone resin binder.

15 Claims, 8 Drawing Sheets

(2 of 8 Drawing Sheet(s) Filed in Color)

WET FRICTION MATERIAL

BACKGROUND OF THE INVENTION

1. Field of the Invention

The present invention relates to a wet friction material used in a frictional engagement device such as a clutch and a brake used in oil in an automatic transmission and others of a vehicle such as an automobile.

2. Description of the Related Art

An automatic transmission of a vehicle, for example an automobile, normally includes a multiple disc clutch in which plural friction plates each of which is obtained by bonding a wet friction material to the surface of a metallic substrate (a core plate) and plural separator plates formed by a single plate such as a metallic plate as a subject material of friction are alternately arranged. A driving force is transmitted or disconnected by mutually pressing or releasing these plates in automatic transmission fluid (ATF) used for lubricating oil.

For such wet friction material used in the frictional engagement device used in oil, a paper wet friction material called a paper friction material is generally used. The wet friction material contains: a fiber base material such as a natural pulp fiber, an organic synthetic fiber and an inorganic fiber; a filler; a friction adjuster; and a binder, and a phenol resin is generally used as the binder, and diatomaceous earth is generally used as the filler. Such wet friction material is bonded to both surfaces of the friction plate in a wet multiple disc clutch. The wet multiple disc clutch is normally provided with four to five friction plates. Therefore, 8 to 10 wet friction materials equivalent to the double of them are used.

Recently, the miniaturization and the weight saving of automobile parts are promoted. The situation of the wet multiple disc clutch is similar, and by the reduction of the number of friction plates used in the wet multiple disc clutch, the reduction of an axial dimension (the miniaturization) and the weight saving of the wet multiple disc clutch are reviewed. From such a background, it is required that wet friction material with smaller number of friction plates undertakes the same torque as the above-mentioned conventional type wet friction material and has the same or a more superior frictional characteristic, heat resistance and durability, as compared with the conventional type.

Recently, a wet friction material having a high coefficient of friction is developed, and includes as a filler, a hard metallic powder such as alumina and silicon nitride. However, lately, a still higher coefficient of friction is required in a wet friction material.

It is generally known that the above-mentioned hard metallic powder has a problem that the powder attacks the frictional face of the subject material (that is, chips the face of the subject material such as the surface of a separator). In the meantime, while a granular diatomaceous earth used heretofore has no problem that it attacks the frictional face, it is difficult to acquire a high coefficient of friction.

Further, the wet friction material including alumina and silicon nitride as a filler to enhance the coefficient of friction of the wet friction material has a characteristic that the final coefficient of dynamic friction: $\mu o$ is high, and thus there is a problem that when the wet friction material is used in a clutch, a shock at a gear shifting generates. A part of the wet friction material has a problem to absorb a moisture in air by the action of the hygroscopicity and the water absorption during storing products or transportation and generate the change in dimension.

SUMMARY OF THE INVENTION

The object of the invention is to provide a wet friction material having a high coefficient of friction.

Another object of the invention is to provide a wet friction material: having a high coefficient of friction; hardly damaging the mating frictional face; having an excellent heat resistance and durability; and further, having the small initial fluctuation of a coefficient of friction.

The other object of the invention is to provide a wet friction material: having a higher coefficient of friction, compared with conventional type wet friction material; showing a positive gradient in a $\mu$s-V property [(the coefficient of static friction)-(the number of rotation)] so that the final coefficient of dynamic friction is kept low; and further, having an excellent dimensional stability.

(1) A wet friction material comprising:
  a fiber base material;
  a filler containing a disc-shaped diatomaceous earth; and
  a binder (hereinafter also referred to as a "first wet friction material").

(2) The wet friction material according to the item (1), wherein the disc-shaped diatomaceous earth has an average diameter of 6 to 17 $\mu$m.

(3) The wet friction material according to the item (1) or (2), which comprises the disc-shaped diatomaceous earth in an amount of 30 wt % to 50 wt %, based on total weight of the wet friction material.

(4) The wet friction material according to any one of the items (1) to (3), wherein the fiber base material contains cotton.

(5) A wet friction material comprising:
  a fiber base material;
  a filler containing at least one of a filler having Mohs hardness of 8 to 9.5 and a diatomaceous earth; and
  a binder containing a silicone resin, the silicone resin being a hardened product of a hydrolyzed solution containing a silane coupling agent (hereinafter also referred to as a "second wet friction material").

(6) the wet friction material according to the item (5), wherein the diatomaceous earth is a disc-shaped diatomaceous earth.

(7) The wet friction material according to the item (5) or (6), wherein the filler having Mohs hardness of 8 to 9.5 is alumina.

(8) The wet friction material according to any one of the items (5) to (7), wherein the silane coupling agent is represented by formula (1):

$$(R^1)(R^2)_n Si(OR^3)_{3-n} \qquad (1)$$

wherein $R^1$ represents an alkyl amino group having primary amine at the terminal end; $R^2$ and $R_3$ each independently represents an alkyl group having 1 to 3 carbon atoms; and n represents an integer of 0 or 1.

(9) A wet friction material comprising:
  a fiber base material;
  a filler; and
  a binder containing a silicone resin, the silicone resin being a hardened product of a hydrolyzed solution containing a mixture of a silane coupling agent represented by formula (1) below and a silane coupling agent represented by formula (2) below:

$$(R^1)(R^2)_n Si(OR^3)_{3-n} \qquad (1)$$

wherein R¹ represents an alkyl amino group having primary amine at the end; R² and R³ each independently represents an alkyl group having 1 to 3 carbon atoms; and n represents an integer of 0 or 1, $$(R^4)_m Si(OR^5)_{4-m} \quad (2)$$

wherein R⁴ and R⁵ each independently represents an alkyl group having 1 to 3 carbon atoms; and m represents an integer of 1 or 2 (hereinafter also referred to as a "third wet friction material").

(10) The wet friction material according to the item (9), wherein at least one of the silane coupling agents represented by formulae (1) and (2) has three hydrolyzable groups.

(11) The wet friction material according to the item (9) or (10), wherein a molar ratio of the silane coupling agent represented by formula (2) to that represented by formula (1) is 0.1 to 10.

(12) The wet friction material according to any one of the items (9) to (11), wherein the hydrolyzed solution contains water in an amount not smaller than the amount permitting hydrolyzing for half the number of hydrolysable groups contained in the silane coupling agents, but not larger than twice as much as the amount permitting hydrolyzing for all the number of hydrolysable groups contained in the silane coupling agents.

(13) The wet friction material according to any one of the items (9) to (12), wherein the filler contains at least one of a filler having Mohs hardness of 8 to 9.5 and a diatomaceous earth.

(14) The wet friction material according to the item (13), wherein the diatomaceous earth is a disc-shaped diatomaceous earth.

(15) The wet friction material according to the item (13), wherein the filler having Mohs hardness of 8 to 9.5 is alumina The term "wet friction material" used hereinafter includes all of the first wet friction material, the second wet friction material and the third wet friction material.

In the third wet friction material, the inventors paid their attention to a fact that a silane coupling agent was widely utilized for enhancing the performance of composite materials composed of an organic polymer and inorganic metallic material and earnestly reviewed the hydrolyzed solution of the silane coupling agent. A silane coupling agent is represented by formula: Y—SiX₃, wherein Y represents a reactive organic functional group such as an amino group, an epoxy group, a vinyl group, a methacrylic group and a mercapt group; and X represents a hydrolyzable group such as an alkoxy group. For a mechanism of the action, a hydrolyzable group: X such as an alkoxy group reacts with water to generate a silanol group and it is bonded to a hydroxyl group on the surface of inorganic material. In the meantime, a reactive organic functional group; Y such as an amino group reacts with the reactive group in an organic polymer and is chemically bonded (is covalently bonded). That is, the silane coupling agent functions as an intervening agent between the inorganic material and the organic material and produces effects such as the enhancement of physical strength, the enhancement of the affinity of inorganics to the organic resin and the inhibition of the deterioration of physical strength under high temperature and high humidity. The binder is required to permeate uniformly the whole wet friction material when the silane coupling agent having such a characteristic applies to the paper wet friction material. Thus, the silane coupling agent is required to be particularly excellent in permeability and wettability to fine porous paper base material. From such a viewpoint, as a result of earnestly researching the hydrolyzed solution of a silane coupling agent, the inventors found that a silane coupling agent represented by formula: Y—SiX₃, in which Y represents an amino group; and X represents an alkoxy group, was particularly excellent in permeability and wettability to the paper base material. Also, there is a slight problem in the dimensional stability of wet friction material because of the action of water absorption and hygroscopicity caused by the hydrophilicity of the hardened product of the hydrolyzed solution of the aminosilane. The simultaneous use of a silicon alkoxide having an alkyl group as means to solve the problem was effective and completed the third wet friction material of the invention.

BRIEF DESCRIPTION OF THE DRAWINGS

The file of this patent contains at least one drawing executed in color. Copies of this patent with color drawings will be provided by the Patent and Trademark Office upon request and payment of the necessary fee.

DETAILED DESCRIPTION OF THE INVENTION

Embodiments of the invention will be concretely described below. Wet friction material according to the invention includes a fiber base material, a fiber and a binder. For the fiber base material, a natural pulp fiber such as wood pulp, an organic synthetic fiber such as an aramid fiber and an inorganic fiber such as glass and carbon respectively heretofore used can be used. The fiber base material in the first wet friction material preferably includes cotton.

It is desirable that for the filler, at least one of diatomaceous earth and the filler of 8 to 9.5 in Mohs hardness is used. It is desirable that the diatomaceous earth used for filler is substantially disc-shaped. It is presumed that this reason is that the superficial smoothness of the wet friction material is enhanced by using disc-shaped diatomaceous earth, contact with the frictional face of the subject material becomes satisfactory and as a result, the coefficient of friction is enhanced. Even if pressure is applied to the wet friction material, the wet friction material is seldom broken and it is presumed that the wet friction material is harder, compared with that using granular diatomaceous earth. It is desirable that the average of the diameter of the disc-shaped diatomaceous earth is approximately 5 to 50 µm. The average diameter of disc-shaped diatomaceous earth is more preferably approximately 6 to 17 µm.

The reason why diatomaceous earth having the average diameter of 6 to 17 µm is used is that the diatomaceous earth having the diameters in such a range is suited to enhance the coefficient of frictions For the filler of 8 to 9.5 in Mohs hardness, silicon nitride, alumina, aluminum silicate and others are used. In case the above-mentioned each filler is separately used-and in case the above-mentioned each filler is arbitrarily combined and used, a satisfactory result can be also acquired and, the combination of disc-shaped diatomaceous earth and alumina is extremely excellent. The above-mentioned filler also functions as a friction adjuster.

For the binder of the fiber base material of the wet friction material, the hardened product of the hydrolyzed solution of a silane coupling agent is preferable, the product is excellent in heat resistance and durability and the initial variation of the coefficient of friction of which is small.

In the invention, the hydrolyzed solution of a silane coupling agent which is the source of binder is acquired by putting a silane coupling agent which is main material, water and if necessary, a solvent in a reactor, mixing and agitating them at room temperature or at relatively low temperature [below the boiling point of a solvent (lower alcohol), for example at approximately 40 to 50° C.] for fixed time (for example, for approximately 3 to 5 hours).

For the silane coupling agent, it is desirable that aminosilane excellent in permeability and wettability to paper base material and represented by the following formula 1 is used.

(1)

(In the formula (1), $R^1$ represents an alkyl amino group having primary amine at the terminal ends $R^2$ and $R^3$ respectively independently represent an alkyl group having 1 to 3 carbon atoms and n represents an integer of 0 or 1.)

Concretely, for aminosilane having three alkoxy groups in one molecule, 3-aminopropyltrimethoxysilane, 3-aminopropyltriethoxysilane, N-2-(aminoethyl) 3-aminopropyltrimethoxysilane and others can be given and one type or two or more types of mixture of these can be used. For aminosilane having two alkoxy groups in one molecule, 3-aminopropylmethyldimethoxysilane, 3-aminopropylmethyldietoxysilane, N-2-(aminoethyl) 3-aminopropylmethyldimethoxysilane, N-2-(aminoethyl) 3-aminopropylmethyldiethoxysilane and others can be given and one type or two or more types of mixture of these can be used.

Only aminosilane having three alkoxy groups in one molecule (n=0) may be also used or the mixture of aminosilane having three alkoxy groups in one molecule (n=0) and aminosilane having two alkoxy groups in one molecule (n=1) may be also used.

It is desirable that minosilane having three alkoxy groups in one molecule and aminosilane having two alkoxy groups in one molecule are mixed in a range in which the molar ratio of aminosilane having two alkoxy groups in one molecule to the aminosilane having three alkoxy groups in one molecule does not exceed 10. In case the molar ratio of exceeds 10, the bridge density of the hardened product is small, as a result, the heat resistance is not enough and it is undesirable.

In the third wet friction material, the silane coupling agent is the mixture of a silane coupling agent excellent in permeability and wettability to paper base material and represented by the above-mentioned formula (1) and a silane coupling agent contributing to the dimensional stability of the wet friction material and represented by the following formula (2).

(2)

(In the formula (2), $R^4$ and $R^5$ respectively independently represent an alkyl group having 1 to 3 carbon atoms and m represents an integer of 1 or 2.)

For the silane coupling agent represented by the formula (2), trifunctional methyltrimethoxysilane, trifunctional methyltriethoxysilane, bifunctional dimethyldimethoxysilane, bifunctional dimethylethoxysilane and others can be given and one type or two or more types of mixture of these monomers or their low condensation products (for example, approximately dimer to 5-mers) can be used.

At least one of the silane coupling agents represented by the formulas (1) and (2), preferably has three hydrolyzable groups. In case the number of hydrolyzable groups of the silane coupling agents represented by the formulas (1) and (2) is both 2, the heat resistance of the hardened product is not enough and is undesirable.

It is desirable that the molar ratio of the silane coupling agent represented by the formula (2) to that represented by the formula (1) is in a range of 1 to 10. In case the molar ratio is below 0.1, the dimensional stability of the wet friction material is deteriorated by the hygroscopicity and the action of water absorption caused by the hydrophilicity of a hardened product and it is undesirable. In the meantime, since permeability and wettability to paper base material are deteriorated and the physical strength of the wet friction material is deteriorated in case the molar ratio exceeds 10, it is undesirable.

The quantity of added water is not less than quantity in which the haploid number of hydrolyzable groups.(alkoxy groups) in a silane coupling agent can be hydrolyzed, and is not more than double of quantity in which the total number of hydrolyzable group can be hydrolyzed. The quantity of added water is preferably not less than quantity in which the haploid number of hydrolyzable groups (alkoxy groups) in a silane coupling agent can be hydrolyzed and is not more than quantity in which the total number of the hydrolysable group can be hydrolyzed. In case added water is smaller than the above-mentioned quantity, multiple alkoxy groups not reacted yet remain in hydrolyzed solution, the hardenability is deteriorated and it is undesirable in view of the productivity and in addition, energy saving. In the meantime, in case the quantity of added water is much, excess water remains in the hydrolyzed solution, in heat hardening, the excess water causes a phenomenon that the density of a resin component becomes dense from the inside to a surface layer, the percentage content of a hardened product becomes uniform in the direction of the thickness of the friction material and it has a bad effect upon the physical strength and the frictional characteristic. When the quantity of added water exceeds the double of quantity in which the total number of hydrolyzable groups (alkoxy groups) can hydrolyze, excess water remains in large quantity in the hydrolyzed solution, the above-mentioned phenomenon becomes remarkable and it is undesirable. As excess water remains in the hydrolyzed solution when the quantity of added water exceeds quantity in which the total number of hydrolyzable groups (alkoxy groups) can be hydrolyzed, the above-mentioned phenomenon occurs, however, the degree is in an allowable range. In case the quantity of added water is quantity in which the total number of hydrolyzable groups (alkoxy groups) can be hydrolyzed, the quantity of water remaining in the hydrolyzed solution is small and as uniform friction material is acquired, it is preferable.

A solvent is not necessarily an essential component, however, it is normally used to homogeneously mix a silane coupling agent and water in start mixed solution. It is desirable that the concentration of the silane coupling agent in start mixed solution is diluted by lower alcohol such as methanol, ethanol and propanol to be 80 percentage by weight or less. At concentration which exceeds this, the condensation reaction of a silanol group generated by hydrolysis travels and the storage stability of the hydrolyzed solution may be impaired.

To manufacture the wet friction material according to the invention, first, a paper body is formed. This paper body may be acquired by drying, slurry acquired by dispersing fiber base material (including a natural pulp fiber such as wood pulp, an organic synthetic fiber such as an aramid fiber and an inorganic fiber such as glass), filler (such as diatomaceous earth) and a friction adjuster in water at predetermined ratio according to a normal method, but is not particularly limited. The hydrolyzed solution of the silane coupling agent is impregnated this paper body at the rate of 20 to 120 weight for a part of 100 weight of the base material, after the material is dried, it is heated and hardened at approximately 100 to 300° C. for 15 to 30 minutes and the wet friction material is acquired. Next, the wet friction material is punched in a predetermined shape, is integrated with a substrate (a core plate) to which an adhesive is applied, by a heat press and a friction plate can be acquired, however, the above-mentioned process is not particularly limited and another process may be also used.

The silane coupling agent (aminosilane) is made a compound having a silanol group and an amino group in the same molecule by hydrolysis, the condensation polymerization of silanol groups is inhibited because of bipolar ionic structure in a molecule by the amino group and becomes relatively stable solution. The hydrophilic compound having a low molecular weight fully permeates the capillary space of the paper base material, thereafter, the condensation polymerization reaction of the silanol groups is repeated by the evaporation of a solvent and heating, a siloxane bond is formed and is hardened, and both organic and inorganic components of the paper base material are firmly bonded and physical strength exceeding that of phenol resin is acquired. As the hardened product has a siloxane bond (—O—Si—O—) in a main framework, and in the siloxane bond, bond distance between a silicon atom and an oxygen atom is long and the electron density is low, and as a result, the turn of the bond is easy, the hardened product is flexible and elastic. When such a hardened product of the hydrolyzed solution of aminosilane is used for the binder of the wet friction material, the contact area of the surface of the friction material is increased by the enhancement of elasticity, a burn called a heat spot of the mating friction material (a separator plate) caused by a local hit is eliminated, the initial variation of the coeefficient of friction is also slight and the high and stable coefficient of friction is acquired. The binding energy of Si—O in the siloxane bond is 444 kJ/mol (106 kcal/mol) and is very large, compared with 356 kJ/mol (85 kcal/mol) of the binding energy of C—C forming the main framework of organic resin such as phenol resin. Even if the hardened product of the hydrolyzed solution of aminosilane is held under high temperature for a long time, it is stable for frictional heat caused on a frictional slid face because of the magnitude of the binding energy without being deteriorated such as being dissolved and being discolored easily and the heat resistance and the durability of the wet friction material are also satisfactory.

The invention will be described based upon embodiments further concretely below, however, these are examples and the scope of the invention is not limited.

EXAMPLE 1

A first embodiment of the invention will be described below. First, for fiber base material which is a component of raw paper, cotton fiber (35% by weight) and aramid fiber (20% by weight) are used and for filler, the above-mentioned disc-shaped diatomaceous earth (MNPP, manufactured by Celite Corporation) is used by 45% by weight. Raw paper is acquired by dispersing these in water and paper-making. Further, wet friction material is acquired by impregnating the hydrolyzed solution of a silane coupling agent in this paper body, heating and hardening it.

To compare with the first embodiment, a comparative example 1 will be described below. For filler, the above-mentioned disc-shaped diatomaceous earth (MNPP, manufactured by Celite Corporation) (25% by weight) and alumina (20% by weight) are used. A part except the filler is similar to that in the first embodiment.

Figure 1:
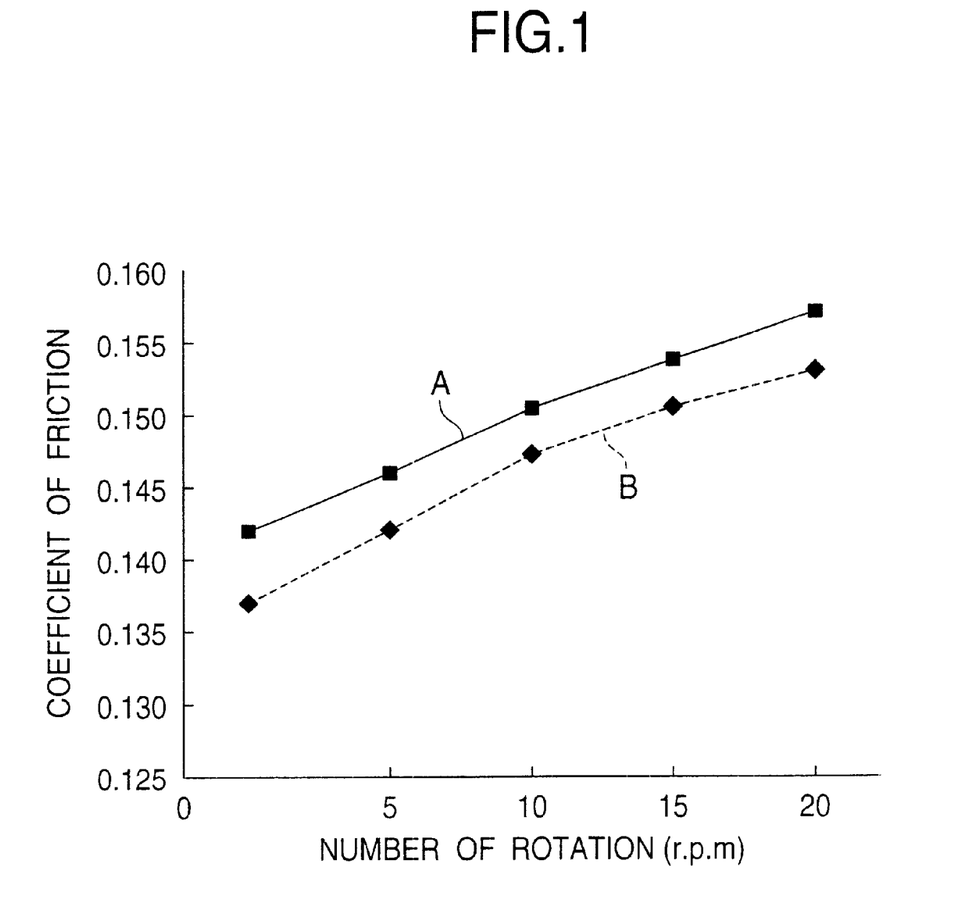
FIG. 1 is a graph comparing a coefficient of friction in an embodiment of the invention and in a comparative example.

FIG. 1 shows the comparison of the first embodiment and the comparative example 1 in a coefficient of friction. As shown in FIG. 1, the y-axis shows a coefficient of friction and the x-axis shows the number of relative rotation.

| The condition of this comparison test is as follows. | |
| --- | --- |
| Oil temperature | 100° C. |
| Number of static rotation | 0.72 to 20 r.p.m |
| Oil level (from axis) | 0.18 l./m. |
| Oil pressure | 784 kPa |

FIG. 1 shows relation between the number of relative rotation and a coefficient of friction in case the wet friction material is fitted to the mating frictional face, being relatively revolved, a curve A shows the first embodiment and a curve B shows the comparative example 1. As the coefficient of friction in the first embodiment is higher, compared with that in the comparative example 1, it can be verified that the wet friction material in the first embodiment has a coefficient of friction not inferior and high enough, compared with that of wet friction material using alumina for filler.

Figure 2:
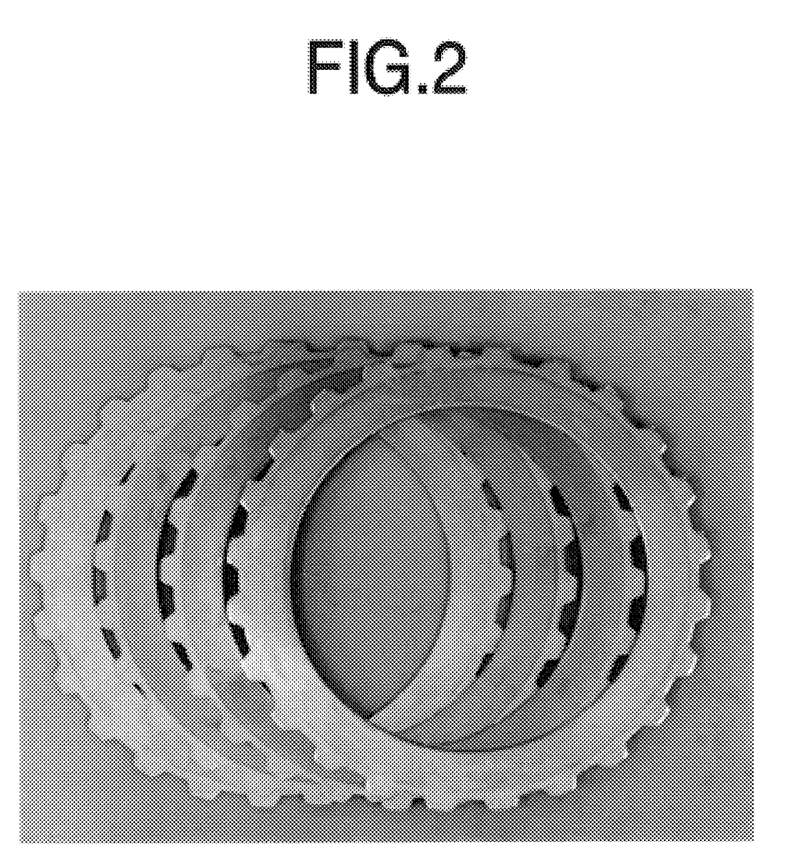
FIG. 2 shows a photograph showing a state of a mating member in the embodiment of the invention after a test.
Figure 3:
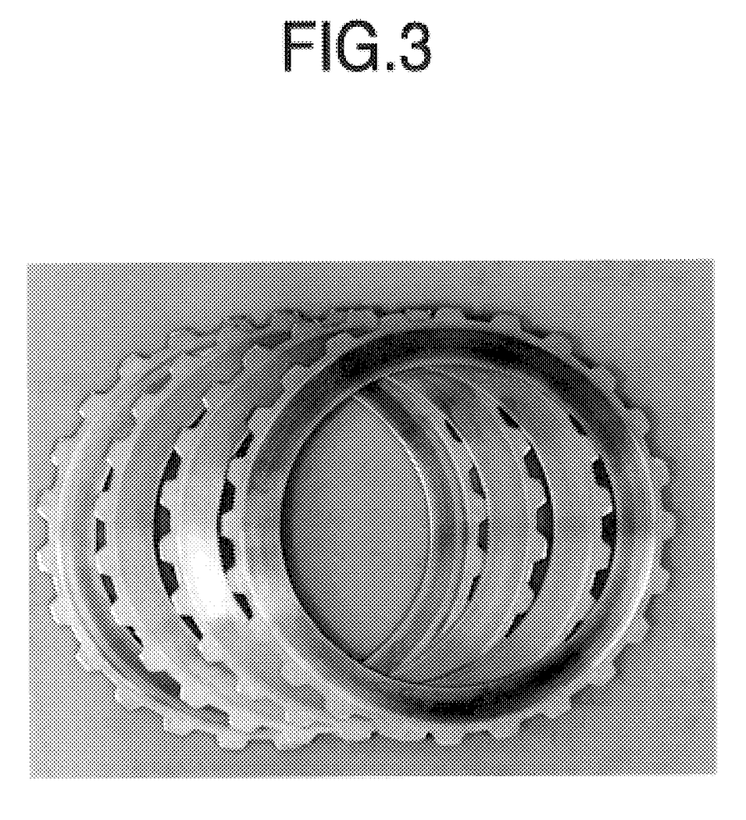
FIG. 3 shows a photograph showing a state of the mating member in the comparative example after a test.

FIGS. 2 and 3 are photographs respectively showing a state of the frictional face of the mating member after a test of 2000 cycles is made under the similar condition to the above-mentioned test condition, FIG. 2 shows a state of the frictional surface of a separator plate used for the mating member in the first embodiment of the invention and FIG. 3 shows a state of the frictional surface of a separator plate used for the mating member in the comparative example 1.

As clear from FIGS. 2 and 3, though the frictional face of a separator plate which is the mating member in the first embodiment of the invention is not rough, the frictional face of the mating member in the comparative example 1 is considerably rough.

As described above, it is known from FIGS. 1 to 3 that the wet friction material according to the invention has a coefficient of friction not inferior and high enough, compared with conventional type wet friction material and in addition, has an excellent character that the mating frictional face is seldom damaged.

Figure 4:
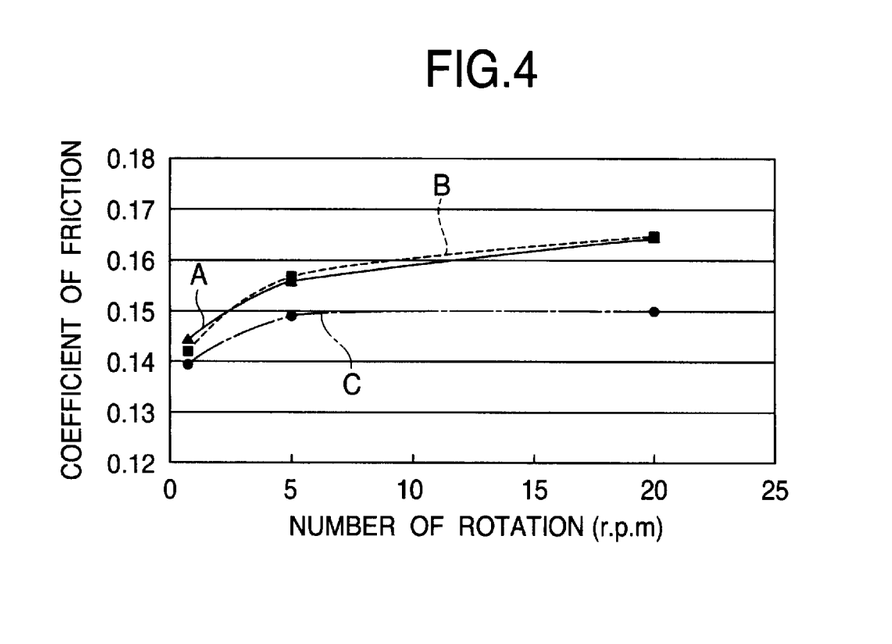
FIG. 4 is a graph showing relation between the compounding amount of diatomaceous earth and a coefficient of friction.

FIG. 4 is a graph showing relation between a coefficient of friction and the number of rotation in case the compounding amount of disc-shaped diatomaceous earth (MNPP, manufactured by Celite Corporation) is changed in the embodiment of the invention. The condition of this test is similar to the above-mentioned case.

A test is respectively made selecting aramid fiber (90%) and disc-shaped diatomaceous earth (10%) in example 2, selecting aramid fiber (70%) and disc-shaped diatomaceous earth (30%) in example 3 and selecting aramid fiber (50%) and disc-shaped diatomaceous earth (50%) in example 4.

A curve A shows the example 4, a curve B shows the example 3 and a curve C shows the example 2. As known from the curves A and B, the examples 3 and 4 show approximately the same value and the coefficient of friction is 0.15 ore more, while the coefficient of friction in the example 2 is shown by the curve C, is between 0.14 and 0.15, is clearly low and it is known that for the compounding amount of disc-shaped diatomaceous earth, 30% or more is desirable.

In the example 1 of the invention, as described above, cotton fiber of 35% by weight is included in fiber base material, however, as this reason is that the coefficient of friction of cotton fiber is higher, compared with that of aramid fiber and in addition, the cotton fiber is low-priced, it has high practicability.

Figure 5:
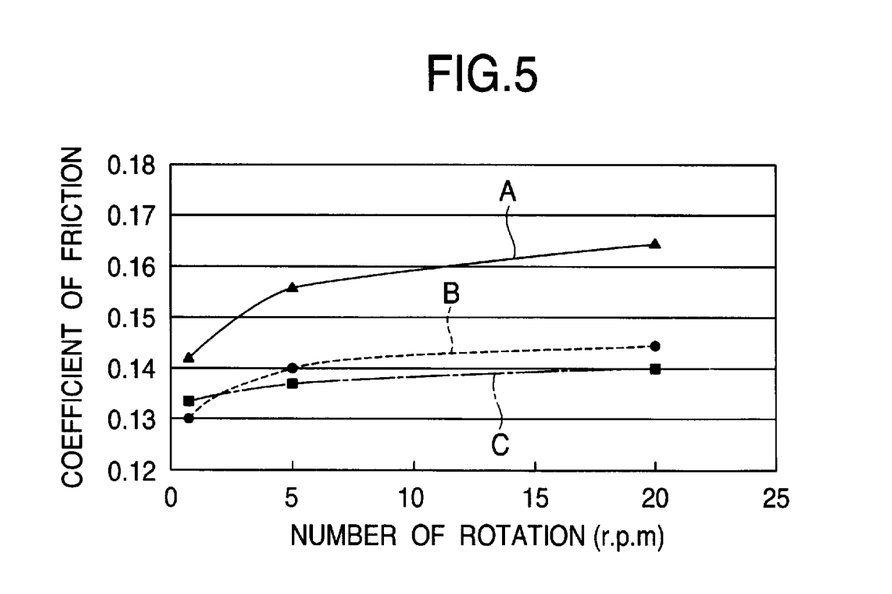
FIG. 5 is a graph showing the comparison of a coefficient of friction between the diatomaceous earth and diatomaceous earth in another shape.

FIG. 5 is a graph showing the respective coefficients of friction in case disc-shaped diatomaceous earth according to the invention and conventional type granular diatomaceous earth are respectively used for filler. A curve A shows the example 1. In this case, in diatomaceous earth, the average diameter of discs is 6 to 17 $\mu$m and the standard deviation of the diameter of discs is approximately 8.813. (The reason why the average diameter has width is that the average diameter of each lot of diatomaceous earth is different.)

A curve B shows a comparative example 2. The compounding amount of each component in the comparative example 2 is the same as that in the example 1, however, diatomaceous earth is granular, the average of the particle diameters is 2 to 4 $\mu$m, the standard deviation is approximately 5.20 and a curve C shows a comparative example 3. In the comparative example 3, the compounding amount is also the same, diatomaceous earth is granular, mean particle diameter is 2 to 12 $\mu$m and the standard deviation is approximately 8.28.

It is known from the drawing that though much different in the diameter of a disc and a particle diameter is not made between the case of the disc-shaped diatomaceous earth and the comparative example 3, the coefficient of friction is higher in the case of disc-shaped diatomaceous earth, compared with that of granular one.

Figure 6:
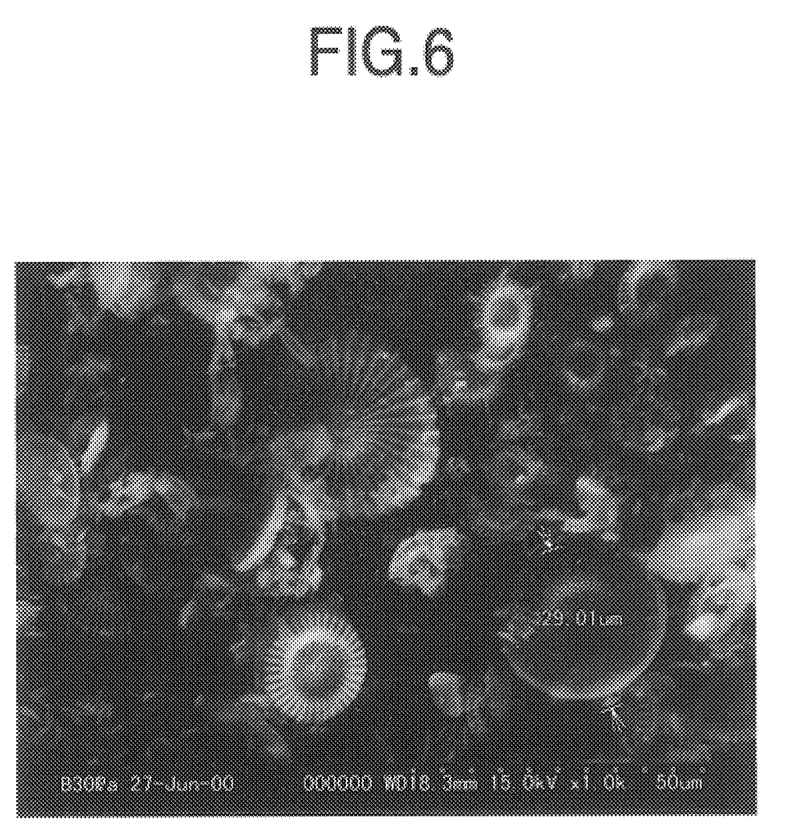
FIG. 6 shows an enlarged photograph showing disc-shaped diatomaceous earth used in the embodiment of the invention.

FIG. 6 shows the enlarged photograph of disc-shaped diatomaceous earth used in the embodiment of the invention.

EXAMPLE 5

For a component of fiber base material, cellulose fiber (25% by weight) and aramid fiber (25% by weight) are used and a paper body is acquired by drying slurry acquired by dispersing disc-shaped diatomaceous earth (MNPP, manufactured by Celite Corporation) (30% by weight) and alumina (20% by weight) for filler in water and paper-making. In the meantime, the hydrolyzed solution of 3-aminopropyltriethoxysilane (a silane coupling agent) is acquired by adding ethanol of 93 by weight and water of 54 by weight in 3-aminopropyltriethoxysilane of 221 by weight and reacting them at 40° C. for 5 hours. Wet friction material including a paper body of 100 by weight and binder of 40 by weight is acquired by diluting this solution with ethanol, drying after the paper body is impregnated with it, heating at 200° C. for 30 minutes and hardening. Next, the wet friction material is integrated with a core plate in the shape of a ring and made of metal by punching the wet friction material in the shape of a ring the outside diameter of which is 130 mm and the inside diameter of which is 100 mm and holding it in a die heated up to 200° C. under the pressure of 4.9 MPa or more for 30 seconds, and a friction plate the diameter of which is 130 mm and the thickness of which is 2.3 mm is acquired. For reference, an enlarged photograph showing disc-shaped diatomaceous earth used in this embodiment is shown in FIG. 6.

Comparative Example 4

A paper body is acquired by drying slurry acquired by dispersing cellulose fiber of 25% by weight, aramid fiber of 25% by weight respectively for a component of fiber base material, diatomaceous earth of 30% by weight and graphite of 20% by weight respectively for filler in water and paper-making. In the meantime, wet friction material including a paper body of 100 by weight and binder (phenol resin) of 40 by weight is acquired by diluting genuine liquid phenol resin including a non-volatile matter of 50% with methanol, drying after the paper body is impregnated with it, heating at 180° C. for 30 minutes and hardening. A friction plate the diameter of which is 130 mm and the thickness of which is 2.3 mm is acquired by the similar process to that in the example 5.

Comparative Example 5

A paper body is acquired by drying slurry acquired by dispersing cellulose fiber of 25% by weight, aramid fiber of 25% by weight respectively for a component of fiber base material and alumina of 50% by weight for filler in water and paper-making. Wet friction material including a paper body of 100 by weight and binder (phenol resin) of 40 by weight is acquired by the similar process to that in the comparative example 4. A friction plate the diameter of which is 130 mm and the thickness of which is 2.3 mm is acquired by the similar process to that in the example 5.

($\mu$s-V property test)

Figure 7:
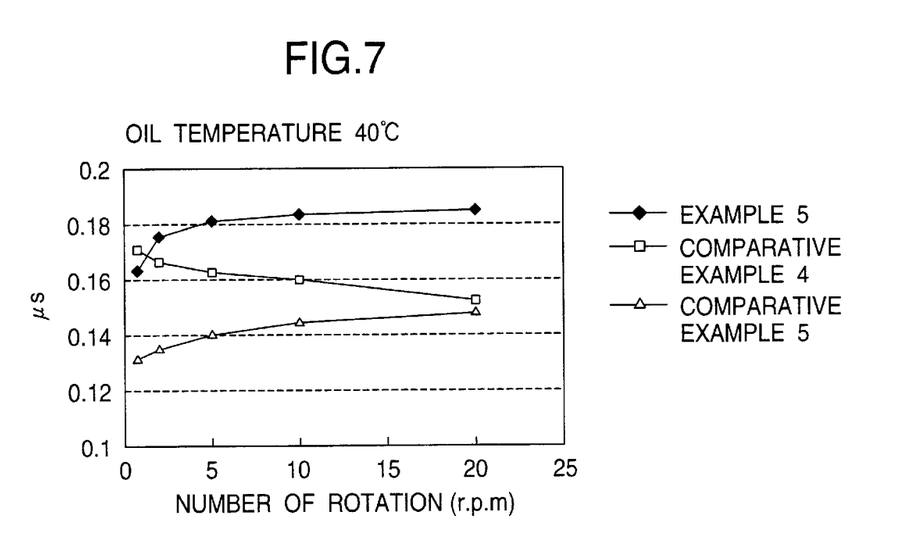
FIG. 7 is a graph showing the comparison of $\mu s$-V property at the oil temperature of 40° C.
Figure 8:
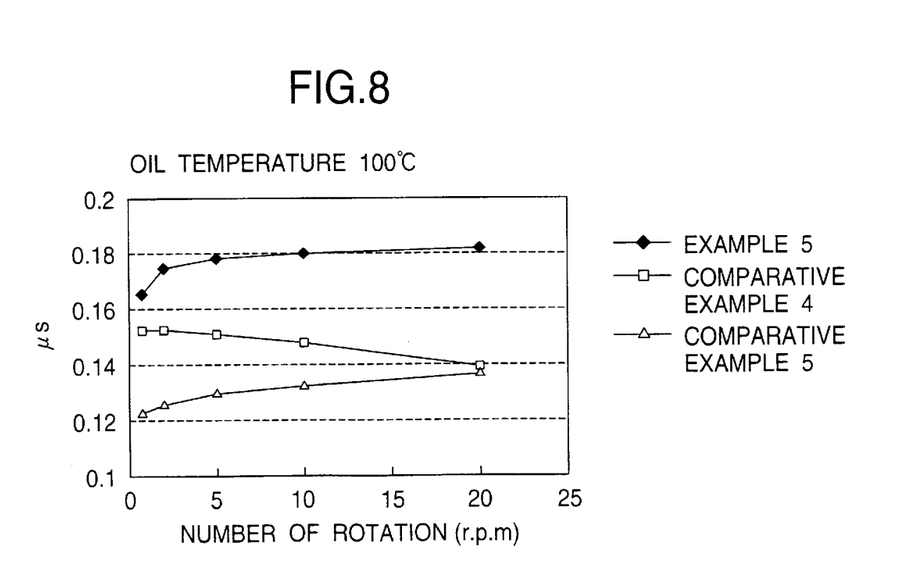
FIG. 8 is a graph showing the comparison of $\mu s$-V property at the oil temperature of 100° C.

The $\mu$ s-V property of the wet friction material respectively acquired in the example 5 and the comparative examples 4 and 5 was evaluated under the following test condition using a friction performance tester (SAE No. 2). FIGS. 7 and 8 show the results.

| | |
|---|---|
| Number of rotation | 0.72, 2, 5, 10, 15, 20 rpm |
| Surface pressure | 785 kPa |
| Inertia | 0.343 N · m · s$^2$ |
| Number of frictional faces | 6 |
| Oil level | Oil bath 700 ml |
| Oil temperature | 40° C. (FIG. 7), 100° C. (FIG. 8) |
| Frictional area | 47.38 cm$^2$/face |

As known from FIGS. 7 and 8, the value of $\mu$s in the comparative example 5 is higher, compared with that in the comparative example 4. However, it is lower, compared with that in the example 5. The values of $\mu s$ in the example 5 and in the comparative example 4 have a positive grade, that is, as the number of rotation increase, a coefficient of friction increases, however, the values of $\mu s$ in the comparative example 5 reversely have a negative grade. Further, when FIGS. 7 and 8 are compared, the values of $\mu s$ shown in FIG. 8, that is, under nigh temperature are lower as a whole. However, it is known that the degree of the decrease of the values of $\mu s$ in the invention is extremely small, compared with that in the comparative examples 4 and 5. That is, in the example 5, a high coefficient of friction is also maintained under high temperature.

Figure 9:
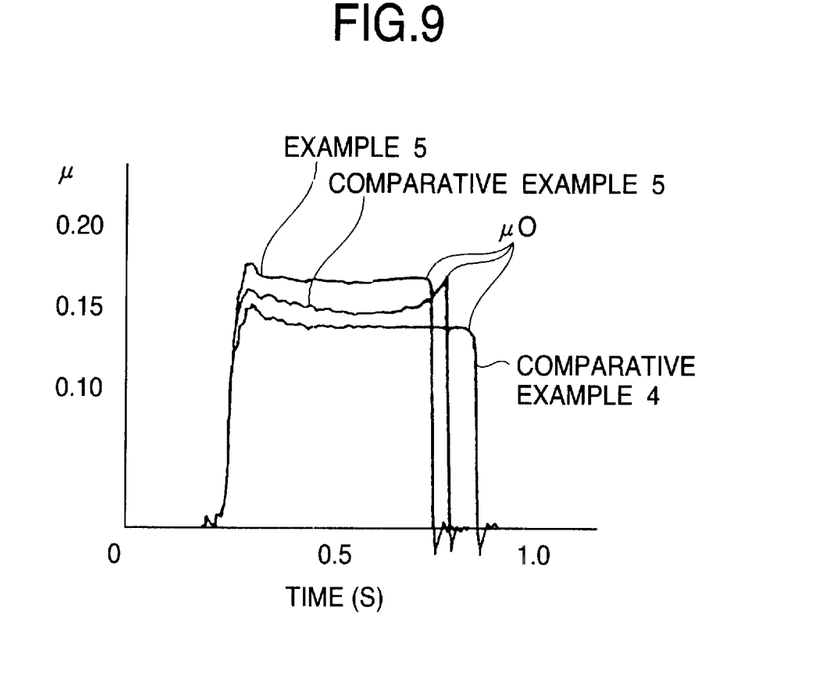
FIG. 9 is a graph showing the comparison of torque waveforms.

FIG. 9 shows torque waveforms in the example 5 and in the comparative examples 4 and 5. The condition of a test is the same as that in the above-mentioned $\mu s$-V property test except that the number of rotation is 3600 rpm (oil temperature is 100° C.) It is known from FIG. 9 that the waveform of a coefficient of dynamic friction in a final part $\mu o$ of the torque waveform in the comparative example 5 rises, however, the waveform in $\mu o$ in the example 5 and the comparative example 4 does not rise. In the example 5, the coefficient of friction is higher, compared with that in the comparative example 4. Dependency upon heat resistance and surface pressure in the example has the similar performance to that in the comparative example 4.

(Adjustment of Paper Body)

A paper body A is acquired by drying slurry acquired by dispersing the mixture of cellulose fiber of 35% by weight, aramid fiber of 20% by weight respectively for a component of fiber base material and diatomaceous earth of 45% by weight for filler in water and paper-making.

Also, a paper body B is acquired by the similar process except that disc-shaped diatomaceous earth (MNPP, manufactured by Celite Corporation) of 25% by weight and alumina of 20% by weight are used for filler. For reference, FIG. 6 shows an enlarged photograph showing the disc-shaped diatomaceous earth.

(Adjustment of Hydrolyzed Solution)

Ethanol of 156 by weight and water of 90 by weight are added in 3-aminopropyltriethoxysilane of 221 by weight and dimethyldiethoxysilane of 148 by weight, are reacted at 40° C. for 5 hours and hydrolyzed solution A is acquired.

Also, ethanol of 93 by weight and water of 54 by weight are added in 3-aminopropyltriethoxysilane of 221 by weight, are reacted at 40° C. for 5 hours and hydrolyzed solution B is acquired.

EXAMPLE 6

Wet friction material including the paper body of 100 by weight and binder of 40 by weight is acquired by diluting the hydrolyzed solution A with ethanol, drying after the paper body A is impregnated with it, heating at 150° C. for 30 minutes and hardening. Next, the wet friction material is integrated with a core plate in the shape of a ring and made of metal by punching the wet friction material in the shape of a ring the outside diameter of which is 130 mm and the inside diameter of which is 100 mm and holding it in a die heated up to 200° C. under the pressure of 4.9 MPa (50 kg/cm$^2$) or more for 30 seconds, and a friction plate the diameter of which 130 mm and the thickness of which is 2.3 mm is acquired.

EXAMPLE 7

Wet friction material including the paper body of 100 by weight and binder of 40 by weight is acquired by diluting the hydrolyzed solution A with ethanol, drying after the paper body B is impregnated with it, heating at 150° C. for 30 minutes and hardening. A friction plate the diameter of which is 130 mm and the thickness of which is 2.3 mm is acquired by the similar process to that in the first embodiment.

Comparative Example 6

Wet friction material including the paper body of 100 by weight and binder of 40 by weight is acquired by diluting undenatured resol-type liquid phenol resin with ethanol, drying after the paper body A is impregnated with it, heating at 150° C. for 30 minutes and hardening. A friction plate the diameter of which is 130 mm and the thickness of which is 2.3 mm is acquired by the similar process to that in the example 6.

Comparative Example 7

Wet friction material including the paper body of 100 by weight and binder of 40 by weight is acquired by diluting the hydrolyzed solution B with ethanol, drying after the paper body A is impregnated with it, heating at 150° C. for 30 minutes and hardening. A friction plate the diameter of which is 130 mm and the thickness of which is 2.3 mm is acquired by the similar process to that in the example 6.

(Evaluation Test)

Evaluation of Dimensional Stability

Figure 10:
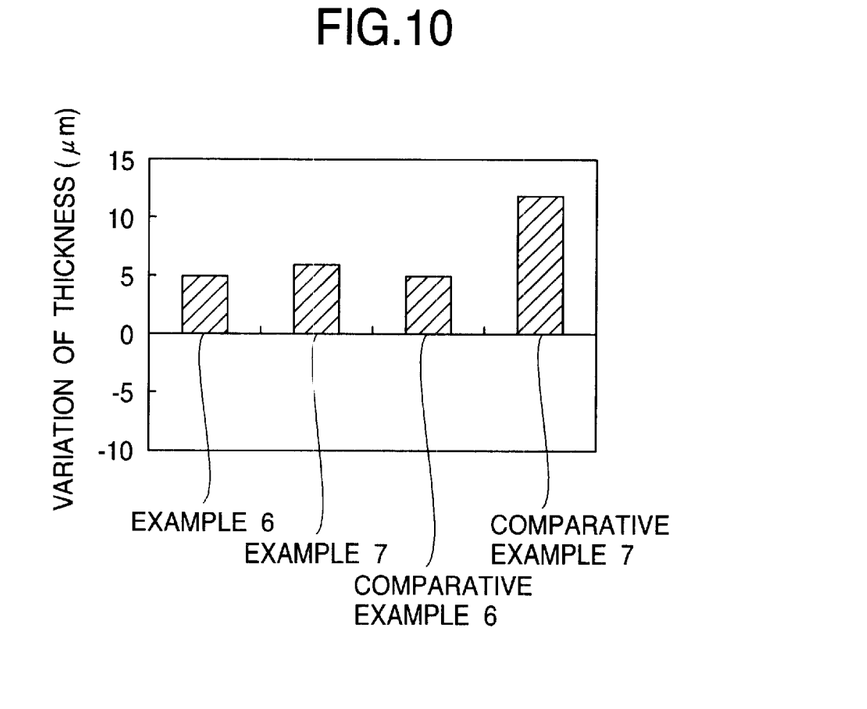
FIG. 10 is a graph comparing the variation of thickness.

Each friction plate acquired in the examples 6 and 7 and the comparative examples 6 and 7 is left for seven days as it is, in a thermo-hygrostat bath adjusted so that inside temperature is 23° C. and inside humidity is 60% and the variation of the thickness is measured. FIG. 10 shows the results. It is known from FIG. 10 that in the examples 6 and 7, the variation of the thickness is smaller, compared with that in the comparative example 7 and each friction plate acquired in the examples 6 and 7 is excellent in dimensional stability.

$\mu s$-V Property Test

Figure 11:
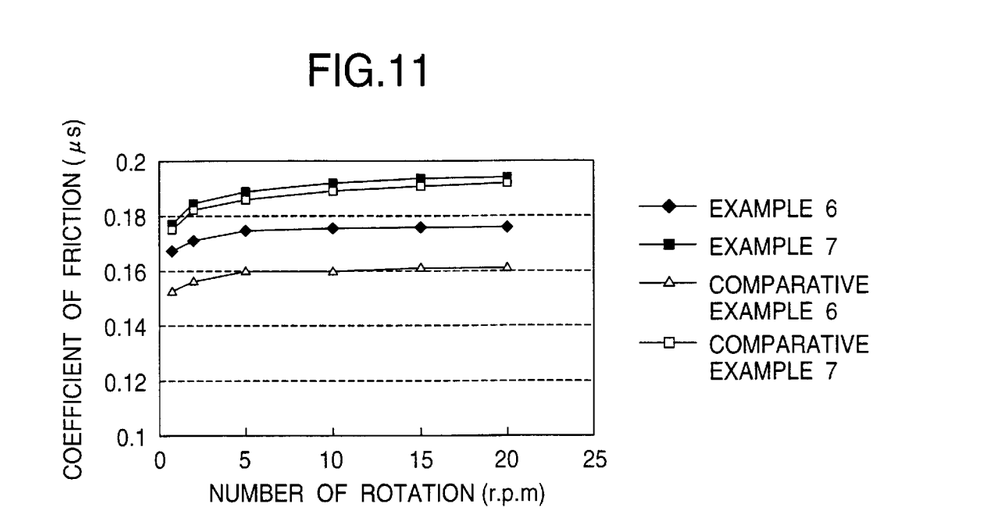
FIG. 11 is a graph showing the comparison of $\mu s$-V property at the oil temperature of 40° C.
Figure 12:
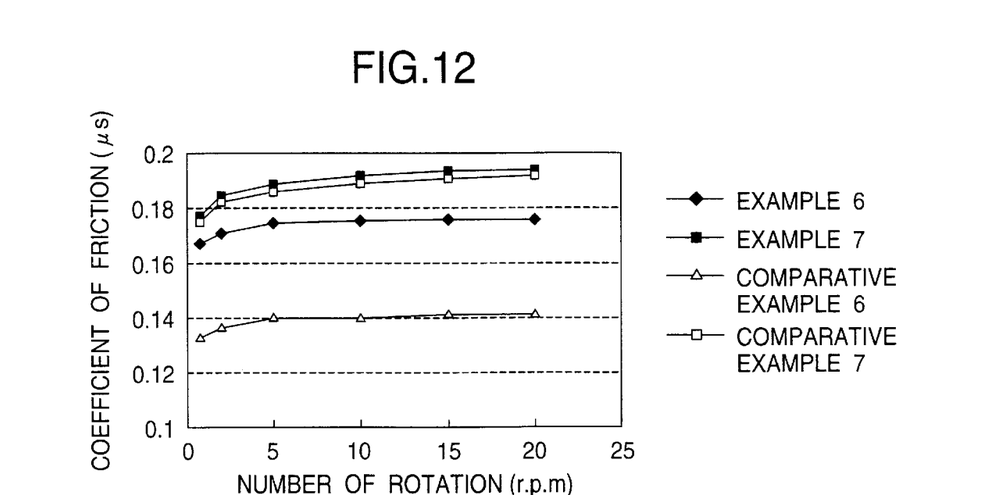
FIG. 12 is a graph showing the comparison of $\mu s$-V property at the oil temperature of 100° C.

The $\mu s$-V property of the wet friction material respectively acquired in the examples 6 and 7 and the comparative examples 6 and 7 was evaluated under the following test condition using a friction performance tester (SAE No. 2). FIGS. 11 and 12 show the results.

| | |
|---|---|
| Number of rotation | 0.72, 2, 5, 10, 15, 20 rpm |
| Surface pressure | 785 KPa |
| Inertia | 0.343 N · m · s$^2$ |
| Number of frictional faces | 6 |
| Oil level | Oil bath 700 ml |
| Oil temperature | 40° C. (FIG. 11), 100° C. (FIG. 12) |
| Frictional area | 47.28 cm$^2$/face |

As known from FIGS. 11 and 12, the value of As of the wet friction material in the examples 6 and 7 is higher, compared with that in the comparative example 6, the value of $\mu s$ also hardly lowers under high temperature and dependency upon temperature is very small. It is also known that the value of $\mu s$ of the wet friction material in the example 7 is higher, compared with that in the comparative example 7. The $\mu s$-V property of the wet friction material in the examples 6 and 7 has a positive grade, that is, as the number of rotation increases, the coefficient of friction increases (similarly in the comparative examples 6 and 7).

The wet friction material according to the invention is configured as described above and has a high coefficient of friction.

The first wet friction material has a high coefficient of friction in addition without damaging the frictional face of the subject material, is excellent in heat resistance and durability and hardly has the initial variation of the coefficient of friction.

According to the second wet friction material according to the invention, it has a higher coefficient of friction, compared with conventional type wet friction material and satisfactory effect that the $\mu s$-V property has a positive grade is acquired.

According to the third wet friction material according to the invention, it has a higher coefficient of friction, compared with conventional type wet friction material (phenol resin is used for binder), the $\mu s$-V property has a positive grade and further, the dimensional stability is also satisfactory.

The entire disclosure of each and every foreign patent application from which the benefit of foreign priority has been claimed in the present application is incorporated herein by reference, as if fully set forth.

What is claimed is:

1. A wet friction material comprising:
   a fiber base material;
   a filler containing a disc-shaped diatomaceous earth; and
   a binder.

2. The wet friction material according to claim 1, wherein the disc-shaped diatomaceous earth has an average diameter of 6 to 17 $\mu$m.

3. The wet friction material according to claim 1, which comprises the disc-shaped diatomaceous earth in an amount of 30 wt % to 50 wt %, based on total weight of the wet friction material.

4. The wet friction material according to claim 1, wherein the fiber base material contains cotton.

5. A wet friction material comprising:
   a fiber base material;
   a filler containing at least one of a filler having Mohs hardness of 8 to 9.5 and a diatomaceous earth; and
   a binder containing a silicone resin, the silicone resin being a hardened product of a hydrolyzed solution containing a silane coupling agent.

6. The wet friction material according to claim 5, wherein the diatomaceous earth is a disc-shaped diatomaceous earth.

7. The wet friction material according to claim 5, wherein the filler having Mohs hardness of 8 to 9.5 is alumina.

8. The wet friction material according to claim 5, wherein the silane coupling agent is represented by formula (1):

$$(R^1)(R^2)_n Si(OR^3)_{3-n} \qquad (1)$$

wherein $R_1$ represents an alkyl amino group having primary amine at the terminal end; $R^2$ and $R^3$ each independently represents an alkyl group having 1 to 3 carbon atoms; and n represents an integer of 0 or 1.

9. A wet friction material comprising:
   a fiber base material;
   a filler; and
   a binder containing a silicone resin, the silicone resin being a hardened product of a hydrolyzed solution containing a mixture of a silane coupling agent represented by formula (1) below and a silane coupling agent represented by formula (2) below;

$$(R^1)(R^2)_n Si(OR^3)_{3-n} \qquad (1)$$

wherein $R^1$ represents an alkyl amino group having primary amino at the end; $R^2$ and $R^3$ each independently represents an alkyl group having 1 to 3 carbon atoms; and n represents an integer of 0 or 1, $$(R^4)_m Si(OR^5)_{4-m} \qquad (2)$$

wherein $R^4$ and R5 each independently represents an alkyl group having 1 to 3 carbon atoms; and m represents an integer of 1 or 2.

10. The wet friction material according to claim 9 wherein at least one of the silane coupling agents represented by formulae (1) and (2) has three hydrolyzable groups.

11. The wet friction material according to claim 9, wherein a molar ratio of the silane coupling agent represented by formula (2) to that represented by formula (1) is 0.1 to 10.

12. The wet friction material according to claim 9, wherein the hydrolyzed solution contain s water in an amount not smaller than the amount permitting hydrolyzing for half the number of hydrolysable groups contained in the silane coupling agents, but not larger than twice as much as the amount permitting hydrolyzing for all the number of hydrolysable groups contained in the silane coupling agents.

13. The wet friction material according to claim 9, wherein the filler contains at least one of a filler having Mohs hardness of 8 to 9.5 and a diatomaceous earth.

14. The wet friction material according to claim 13, wherein the diatomaceous earth is a disc-shaped diatomaceous earth.

15. The wet friction material according to claim 13, wherein the filler having Mohs hardness of 8 to 9.5 is alumina.

* * * * *